US007162439B2

(12) United States Patent
Panelli (10) Patent No.: US 7,162,439 B2
(45) Date of Patent: Jan. 9, 2007

(54) WORKSTATION CONFIGURATION AND SELECTION METHOD AND APPARATUS

(75) Inventor: Edward J. Panelli, Chicago, IL (US)

(73) Assignee: General Electric Company, Schenectady, NY (US)

( * ) Notice: Subject to any disclaimer, the term of this patent is extended or adjusted under 35 U.S.C. 154(b) by 1075 days.

(21) Appl. No.: 09/747,476

(22) Filed: Dec. 22, 2000

(65) Prior Publication Data

US 2002/0082850 A1  Jun. 27, 2002

(51) Int. Cl.
*G06Q 30/00* (2006.01)
(52) U.S. Cl. .......................................... 705/26; 705/27
(58) Field of Classification Search ............ 705/26–27, 705/2–3, 10, 37; 706/46–47
See application file for complete search history.

(56) References Cited

U.S. PATENT DOCUMENTS

| | | | | | |
|---|---|---|---|---|---|
| 4,189,775 | A | * | 2/1980 | Inouye et al. ................. 378/11 |
| 4,302,672 | A | * | 11/1981 | Kato et al. ................... 250/582 |
| 4,315,318 | A | * | 2/1982 | Kato et al. ................... 382/264 |
| 4,438,495 | A | * | 3/1984 | Collins et al. .............. 382/131 |
| 4,792,900 | A | * | 12/1988 | Sones et al. ................ 600/407 |
| 5,224,177 | A | * | 6/1993 | Doi et al. .................... 382/168 |
| 5,235,510 | A | * | 8/1993 | Yamada et al. ............. 600/300 |
| 5,321,520 | A | * | 6/1994 | Inga et al. ................... 358/403 |
| 5,469,353 | A | * | 11/1995 | Pinsky et al. ............... 382/131 |
| 5,513,101 | A | * | 4/1996 | Pinsky et al. .................. 705/3 |
| 5,586,262 | A | * | 12/1996 | Komatsu et al. ............... 705/2 |
| 5,655,084 | A | * | 8/1997 | Pinsky et al. .................. 705/3 |
| 5,737,539 | A | * | 4/1998 | Edelson et al. ................ 705/3 |
| 5,779,634 | A | * | 7/1998 | Ema et al. ................... 600/407 |
| 5,845,255 | A | * | 12/1998 | Mayaud ......................... 705/3 |
| 5,876,339 | A | * | 3/1999 | Lemire ....................... 600/425 |
| 5,878,746 | A | * | 3/1999 | Lemelson et al. .......... 600/407 |
| 5,891,157 | A | * | 4/1999 | Day et al. ................... 606/130 |
| 5,953,704 | A | * | 9/1999 | McIlroy et al. ................. 705/2 |
| 6,006,191 | A | * | 12/1999 | DiRienzo ....................... 705/2 |
| 6,070,149 | A | * | 5/2000 | Tavor et al. ................... 705/26 |
| 6,071,288 | A | * | 6/2000 | Carol et al. ................. 606/130 |
| 6,149,585 | A | * | 11/2000 | Gray .......................... 600/300 |
| 6,574,357 | B1 | * | 6/2003 | Wang ......................... 382/132 |
| 6,678,703 | B1 | * | 1/2004 | Rothschild et al. ......... 707/201 |

(Continued)

FOREIGN PATENT DOCUMENTS

EP   735497 A2 * 10/1996

(Continued)

OTHER PUBLICATIONS

Agrawal et al., DERWENT-ACC-No. 1996-435889, Oct. 2, 1996, Identitying association rules in consumer purchasing transaction item sets in transactions from database.*

(Continued)

*Primary Examiner*—Cuong Nguyen
(74) *Attorney, Agent, or Firm*—Fletcher Yoder (57) ABSTRACT

A system and method for providing a radiological imaging workstation system customer with a recommended radiological imaging workstation and/or radiological imaging workstation configuration. The recommended radiological imaging workstation being established by a customer's responses to a plurality of questions. The system has a product selector file and a product configuration file. The product selector file provides a query page with the plurality of questions to be answered by the customer. The product configuration file having a plurality of predicted system values. A Java applet being used to compare the customer's responses to the plurality of questions to the predicted values. The product configuration file supplying a results page with the recommended system.

37 Claims, 6 Drawing Sheets

U.S. PATENT DOCUMENTS

| | | | |
|---|---|---|---|
| 7,072,840 B1 | * | 7/2006 | Mayaud .................... 705/2 |
| 2002/0019751 A1 | * | 2/2002 | Rothschild et al. |
| 2002/0059049 A1 | * | 5/2002 | Bradbury et al. |
| 2002/0065758 A1 | * | 5/2002 | Henley |

FOREIGN PATENT DOCUMENTS

| | | | |
|---|---|---|---|
| EP | 742524 A2 | * | 11/1996 |
| GB | 2350458 A | * | 11/2000 |
| JP | 05304605 A | * | 11/1993 |
| JP | 10124574 A | * | 5/1998 |
| JP | 2004048655 A | * | 2/2004 |
| WO | WO 9612243 A1 | * | 4/1996 |
| WO | WO 9809245 A1 | * | 3/1998 |
| WO | WO 200043850 A2 | * | 7/2000 |

OTHER PUBLICATIONS

Ghozlan R. et al., Where is imaging going in rheumatology?, from Dialog(R)File 73, acc. No. 10963934, published 2000.*

Sabatino C. et al., Difficult traumatology: The ankle (pilon of the tibia). Radiographic assessment, from DIALOG(R) File 73, acc. No. 10895465, published in 2000.*

Hess U. et al., MRI in the assessment of gunshot injuries, DIALOG(R) File 73, acc. No. 10787159, published in 2000).*

Iwinska-Zelder J. et al., Epiphyseal injuries of the distal tibia: Does MRI provide useful additional information?, from DIALOG(R)File 73, acc. No. 07624946, published in 1999.*

Dinges S. et al., Comparison of conventional and virtual simulation for radiation treatment planning of malignant lymphoma, from DIALOG(R)File 73, acc. No. 07434093, pulished in 1998.*

Umans H. et al., Slipped capital femoral epiphysis: A physeal lesion diagnosed by MRI, with radiographic and CT correlation, from DIALOG(R)File 73, acc. No. 07230450, published in 1998.*

Batra P. et al., Evaluation of intrathoracic extent of lung cancer by plain chest radiography, computed tomography, and magnetic resonance imaging, from DIALOG(R)File 73, acc. No. 03706782, published in 1988.*

* cited by examiner

PRODUCT SELECTION GUIDE — 166

DO YOU NEED A PERFORMANCE OR A PROMOTIONAL SYSTEM?
- ○ PERFORMANCE — 184
- ○ PROMOTIONAL
- HELP ME — 186

168 — DO YOU WANT SINGLE OR DUAL MONITORS?
- ○ SINGLE
- ○ DUAL
- HELP ME — 186

170 — DO YOU WANT LOCAL ARCHIVE OPTION?
- ○ NONE
- ○ ADV. WORKSTATION DRIVE
- HELP ME — 186

172 — DO YOU WANT FILMING CAPABILITY?
- ○ NONE
- ○ ADV. WORKSTATION ANALOG FILMING — 184
- ○ ADV. WORKSTATION DIGITAL FILMING
  ⋮
- HELP ME — 186

174 — DO YOU WANT ADDITIONAL MEMORY?
- ○ NONE
- ○ ADDITIONAL 512MB RAM
- HELP ME — 186

176 — DO YOU NEED NETWORK CONNECTIVITY?
- ○ YES, I HAVE A STANDARD CABLE NETWORK
- ○ YES, I HAVE A FIBER IPTIC CABLE NETWORK
- HELP ME — 186

178 — SELECT ADVANCED SOFTWARE APPLICATION(S)
- ○ VOLUME ANALYSIS
- ○ AW 4.0 SOFTWARE
- ○ VOLUME RENDERING SOFTWARE
  ⋮
- HELP ME — 186

[ RECOMMEND A SYSTEM ] — 194

WORKSTATION CONFIGURATION AND SELECTION METHOD AND APPARATUS

FIELD OF THE INVENTION

The present invention relates generally to a method and apparatus for providing purchasing information to a radiological imaging workstation customer, and more particularly, to a method and apparatus to enable a radiological imaging workstation supplier to provide a customer with a recommended radiological imaging workstation.

BACKGROUND OF THE INVENTION

Historically, medical diagnostic images were recorded by exposing an imaging plate to a source of penetrating radiation. To view the image on the imaging plate, the imaging plate, or a recording of the image on the imaging plate, would have to be physically brought to the viewer. Many imaging systems now record images electronically, rather than by exposing an imaging plate. The imaging systems may be coupled to a digital imaging and archiving system so that the digital images recorded by the imaging systems may be transmitted electronically to remote locations for viewing. A radiological image viewing system is used at the remote location to convert the digital data into a viewable image. Additionally, radiological imaging workstations enable an operator to manipulate the images. Furthermore, radiological imaging workstations are multi-modal, thus allowing an operator to view and manipulate images from a number of different type imaging systems, such as Computed Tomography (CT) and Magnetic Resonance (MR) imaging system.

To purchase a radiological imaging workstation, a customer may contact a supplier of radiological imaging workstations to request information regarding the supplier's radiological imaging workstations. Alternatively, a radiological imaging workstation supplier may contact a customer in hopes of generating sales of radiological imaging workstations. Both parties in each of these cases may consume significant amounts of time attempting to elicit basic information from the other. For example, it may take a radiological imaging workstation supplier a significant amount of time simply to establish the customer's basic radiological imaging workstation needs or desires. Additionally, a customer may expend significant amounts of time obtaining basic information about the radiological imaging workstations available from the supplier. Indeed, the customer may consume time receiving information from a supplier about radiological imaging workstations that are simply not suited for the customer's needs or desires.

There is a need, therefore, for an improved technique for providing a radiological imaging workstation customer with purchasing information regarding a supplier's radiological imaging workstations prior to contact between a sales representative of the supplier and the customer. There is a particular need for a system or method that provides a customer with information for a recommended radiological imaging workstation in response to a customer query designed to provide the supplier with some basic information about the customer's needs for a radiological imaging workstation.

SUMMARY OF THE INVENTION

According to one aspect of the present invention, a system is featured to enable a radiological imaging workstation supplier to provide a customer with a recommended radiological imaging workstation. The system has an application server that directs a query page to the customer via a network. The query page provides the customer with a plurality of questions. The plurality of questions are designed to enable the system to determine a recommended radiological imaging workstation for the customer based on the customer's responses to the questions. The radiological imaging workstation is multi-modal, allowing an operator to view images from imaging systems of different modalities. One or more of the questions provides the customer with a selection of software programs. The software programs enable an operator to view images from different modalities of imaging systems. The system also has a comparison program. The comparison program receives a completed query page from the customer and compares the customer's responses in the completed query page to information stored in the computer system to determine the recommended radiological imaging workstation. The system also has a server to provide a results page to the customer via the network. The results page provides the customer with a recommended radiological imaging workstation.

According to another aspect of the present invention, a computer system is featured that enables a customer to select a radiological imaging workstation from among a plurality of radiological imaging workstations. The computer system has an application server that is coupled to a network. The application server directs a customer to files stored in the computer system. One file stored in the computer system is a product selector file written in a markup language. The product selector file holds a plurality of questions that are designed to obtain data from a customer so as to determine a radiological imaging workstation to recommend to the customer. Also, the product selector file provides the plurality of questions to a query page for delivery to a customer. The computer system also has a program that operates to determine a recommended radiological imaging workstation for the customer by comparing data provided by the customer via the plurality of questions to radiological imaging workstation data stored in the computer system. Another file stored in the computer system is a product configuration file written in a markup language. The product configuration file holds the radiological imaging workstation data used by the program. The product configuration file provides the recommended radiological imaging workstation to a results page for delivery to the customer.

According to another aspect of the present invention, a method is featured for utilizing a computer system to assist a customer to configure a radiological imaging workstation. The method comprises the act of routing a request for assistance from a customer to a product selector file written in extensible markup language (XML). The product selector file fills a template with questions stored in the product selector file. The method also comprises the acts of delivering the template over the network to a customer and receiving the completed template from the customer. The method also comprises the act of determining a recommended radiological imaging workstation configuration by comparing customer data derived from the completed template to supplier data stored in the computer system in a product configuration file. The product configuration file is also written in XML. The product configuration file fills a results page with the recommended radiological imaging workstation configuration for delivery to the customer over the network.

DETAILED DESCRIPTION OF THE INVENTION

Figure 1:
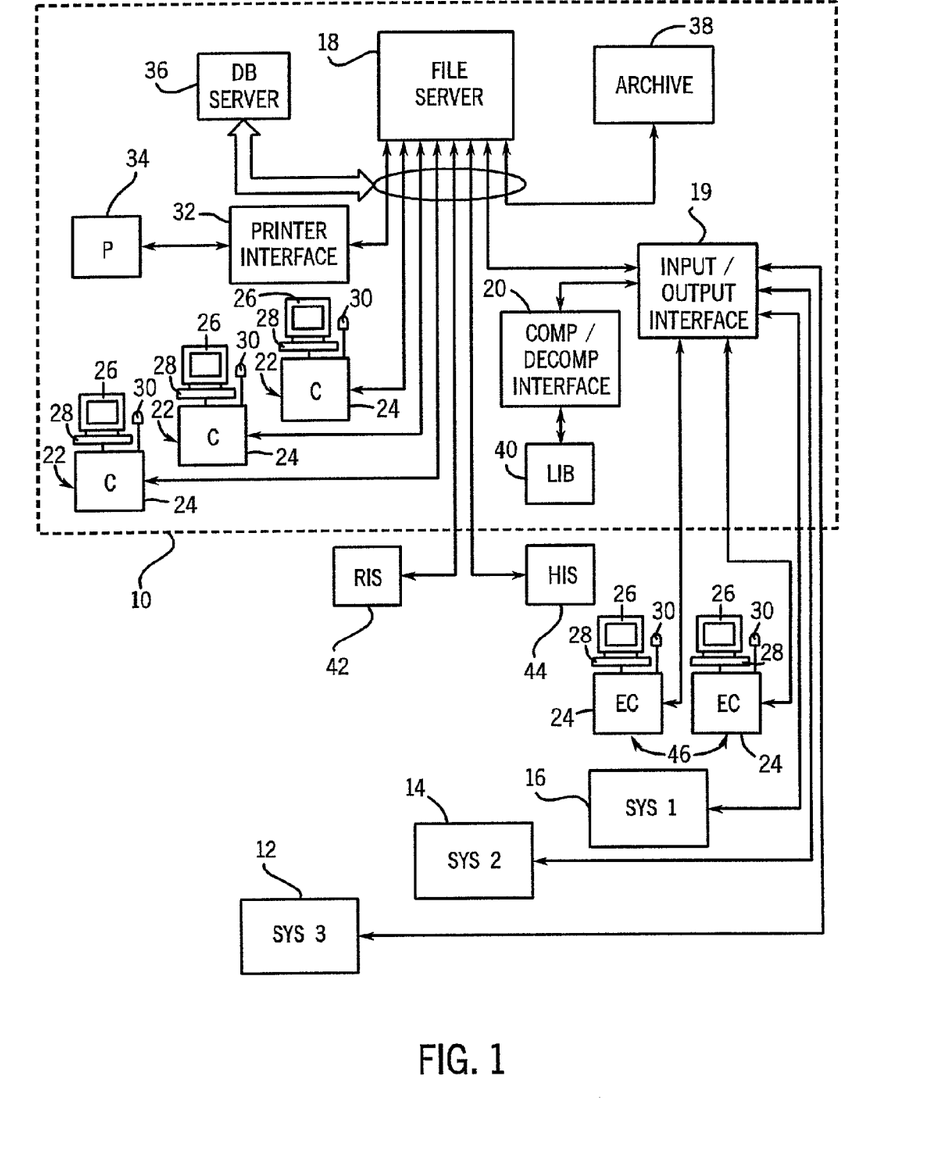
FIG. 1 is a diagrammatical representation of a picture archiving and communication system or PACS for receiving and storing image data in accordance with certain aspects of the present technique.

FIG. 1 illustrates a picture archive and communication system or PACS 10 for receiving, compressing and decompressing image data. In the illustrated embodiment, PACS 10 receives image data from several separate imaging systems designated by reference numerals 12, 14 and 16. As will be appreciated by those skilled in the art, the imaging systems may be of various type and modality, such as magnetic resonance imaging (MR) systems, computed tomography (CT) systems, positron emission tomography (PET) systems, radio fluoroscopy (RF), ultrasound systems, and so forth. Moreover, the systems may include computed radiography (CR) systems or other digitizing stations designed to provide digitized image data from existing film or hard copy images. It should also be noted that the systems supplying the image data to the PACS may be located locally with respect to the PACS, such as in the same institution or facility, or may be entirely remote from the PACS, such as in an outlying clinic or affiliated institution. In the latter case, the image data may be transmitted via any suitable network link, including open networks, proprietary networks, virtual private networks, and so forth.

PACS 10 includes one or more file servers 18 designed to receive and process image data, and to make the image data available for decompression and review. Server 18 receives the image data through an input/output interface 19. Image data may be compressed in routines accessed through a compression/decompression interface 20. As described more fully below, interface 20 serves to compress the incoming image data rapidly and optimally, while maintaining descriptive image data available for reference by server 18 and other components of the PACS. Where desired, interface 20 may also serve to decompress image data accessed through the server. The server is also coupled to internal clients, as indicated at reference numeral 22, each client typically including a radiological imaging workstation 24 at which a radiologist, physician, or clinician may access image data from the server, decompress the image data, and view or output the image data as desired. Client radiological imaging workstation 24 will typically include a computer monitor 26, a keyboard 28, as well as other input devices 30, such as a mouse. The imaging workstation 24 enables the client to view and manipulate data from a plurality of imaging systems, such as MRI systems, CT systems, PET systems, RF, and ultrasound systems.

Server 18 may be coupled to one or more interfaces, such as a printer interface 32 designed to access and decompress image data, and to output hard copy images via a printer 34 or other peripheral. Server 36 also may associate image data, and other work flow information within the PACS by reference to one or more file servers 18. Database server 36 may include cross-referenced information regarding specific image sequences, referring or diagnosing physician information, patient information, background information, work list cross-references, and so forth. The information within database server 36 serves to facilitate storage and association of the image data files with one another, and to allow requesting clients to rapidly and accurately access image data files stored within the system. Similarly, server 18 is coupled to one or more archives 38, such as an optical storage system, which serve as repositories of large volumes of image data for backup and archiving purposes. Techniques for transferring image data between server 18, and any memory associated with server 18 forming a short term storage system, and archive 38, may follow any suitable data management scheme, such as to archive image data following review and dictation by a radiologist, or after a sufficient time has lapsed since the receipt or review of the image files.

In the illustrated system, other components of the PACS system or institution may be integrated with the foregoing components to further enhance the system functionality. For example, as illustrated in FIG. 1, a compression/decompression library 40 is coupled to interface 20 and serves to store compression routines, algorithms, look up tables, and so forth, for access by interface 20 (or other system components) upon execution of compression and decompression routines (i.e. to store various routines, software versions, code tables, and so forth). In practice, interface 20 may be part of library 40. Library 40 may also be coupled to other components of the system, such as client stations 22 or printer interface 32, serving similarly as a library or store for the compression and decompression routines and algorithms. Although illustrated as a separate component in FIG. 1, it should be understood that library 40 may be included in any suitable server or memory device, including within server 18. Moreover, code defining the compression and decompression processes described below may be loaded directly into interface 20 and/or library 40, or may be loaded or updated via network links, including wide area networks, open networks, and so forth.

Additional systems may be linked to the PACS, such as directly to server 36, or through interfaces such as interface 19. In the embodiment illustrated in FIG. 1, a radiology department information system or RIS 42 is linked to server 18 to facilitate exchanges of data, typically cross-referencing data within database server 36, and a central or departmental information system or database. Similarly, a hospital information system or HIS 44 may be coupled to server 36 to similarly exchange database information, workflow information, and so forth. Where desired, such systems may be interfaced through data exchange software, or may be partially or fully integrated with the PACS system to provide access to data between the PACS database and radiology department or hospital databases, or to provide a single cross-referencing database. Similarly, external clients, as designated at reference numeral 46, may be interfaced with the PACS to enable images to be viewed at remote locations. Each external client also typically utilizes a radiological imaging workstation 24 at which a radiologist, physician, or clinician may access image data from the server, decompress the image data, and view or output the image data as desired. Such external clients 46 may employ decompression software, or may receive image files already decompressed by interface 20. Again, links to such external clients may be made through any suitable connection, such as wide area networks, virtual private networks, and so forth.

Figure 2:
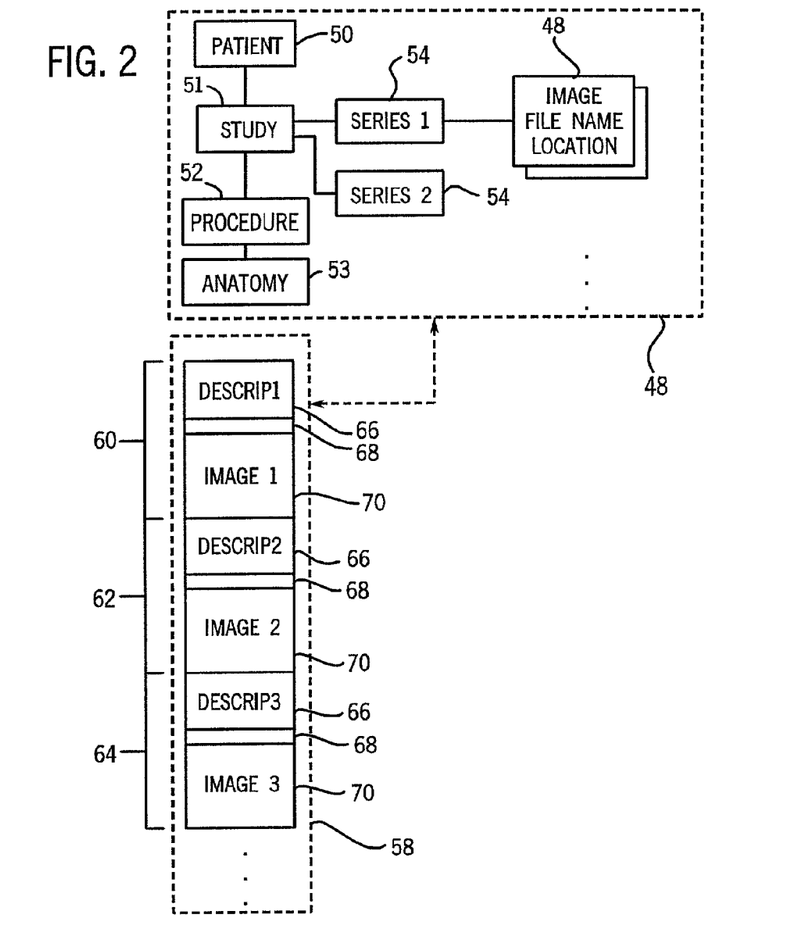
FIG. 2 is a diagrammatical representation of contents of a database for referencing stored image data in files containing multiple image data sets, compressed data, and descriptive information.

FIG. 2 illustrates in somewhat greater detail the type of cross-referencing data made available to clients through database server 36. The database entries, designated generally by reference numeral 48 in FIG. 2, will include cross-referenced information, including patient data 50, references to specific studies or examinations 51, references to specific procedures performed 52, references to anatomy imaged 53, and further references to specific image series 54 within the study or examination. Such cross-referenced information may include further information regarding the time and date of the examination and series, the name of diagnosing, referring, and other physicians, the hospital or department where the images are created, and so forth. The database will also include address information identifying specific images, file names, and locations of the images as indicated at reference numeral 56. Where the PACS includes various associated memory devices or short term storage systems, these locations may be cross-referenced within the database and may be essentially hidden from the end user, the image files simply being accessed by the system for viewing from the specific storage location based upon cross-referenced information in the database.

FIG. 2 also illustrates an exemplary image file cross-referenced by the database entries. As shown in FIG. 2, image file 58 includes a plurality of image data sets 60, 62 and 64. In a typical image file, a large number of such image sets may be defined by a continuous data stream. Each data set may be compressed in accordance with specific compression algorithms, including lossless compression algorithms as described below, lossy compression algorithms, wavelet algorithms, and the preferred compression code table-based optimal compression algorithm described below.

Within each image data set, a descriptive header 66 is provided, along with a compression header 68. The headers 66 and 68 are followed by compressed image data 70. The descriptive header 66 of each data set preferably includes industry-standard or recognizable descriptive information, such as DICOM compliant descriptive data. Such descriptive information will typically include an identification of the patient, image, date of the study or series, modality of the system creating the image data, as well as additional information regarding specific anatomies or features visible in the reconstructed images.

Figure 3:
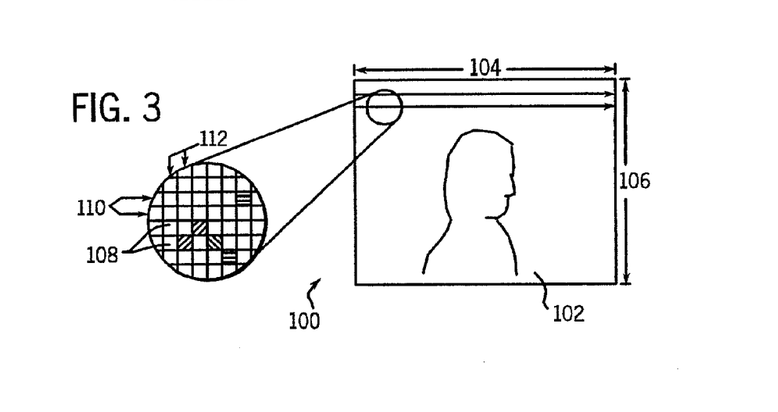
FIG. 3 is a representation of a typical image of the type received, compressed, and stored on the system of FIG. 1.

FIG. 3 illustrates a typical image that is encoded by packets of digitized data assembled in a continuous data stream that may be compressed and decompressed. The image, designated generally by the reference numeral 100, will typically include features of interest 102, such as specific anatomical features. In medical diagnostic applications, such features may include specific anatomies or regions of a patient viewable by virtue of the physics of the image acquisition modality, such as soft tissue in MRI system images, bone in x-ray images, and so forth. Each image is comprised of a matrix having a width 104 and a height 106 defined by the number and distribution of individual pixels 108. The pixels of the image matrix are arranged in rows 110 and columns 112, and will have varying characteristics which, when viewed in the reconstructed image, define the features of interest. In a typical medical diagnostic application, these characteristics will include gray level intensity or color. In the digitized data stream, each pixel is represented by binary code, with the binary code being appended to the descriptive header to aid in identification of the image and in its association with other images of a study. As noted above, such descriptive information may include industry standard information, such as DICOM compliant data.

Radiological imaging workstations may perform a myriad of imaging tasks. A supplier may provide a performance system or a promotional system. The systems selected as promotional systems typically do not have the same level of capabilities as those of a performance system. They also are typically priced less that the performance systems.

Additionally, a variety of different types and styles of monitors may be used with a radiological imaging workstation. This may be an important factor for radiological image viewing. For example, a customer may desire a single monitor or dual monitors. Additionally, a customer may desire a color monitor or a grayscale monitor.

A radiological imaging workstation may also utilize an archiving module. An archiving module enables storage of patient and study data. The data could be stored in a format such as DICOM. The data may be stored in different storage media, such as an optical storage system or a CD-R system.

A radiological imaging workstation may also have a filming capability. A filming capability enables a customer to use an analog camera and convert the image to a digital format using the radiological imaging workstation. Additionally, another filming capability enables the radiological imaging workstation to support network printing without traditional hardware, such as cables.

A radiological imaging workstation may be upgradeable. For example, additional RAM may be added to the typical radiological imaging workstation. Additional memory may be desirable if large image sets are to be manipulated.

A radiological imaging workstation is typically connected to a network of some type. The network may be a standard cable network, a fiber optic cable network, or some other network technology. An interface kit may be used to provide a network interfaces from the workstation to a network jack.

There are a number of different software applications that may be utilized by a radiological imaging workstation. For example, some or all of the following software packages may be operated on a radiological imaging workstation: a volume analysis software package, a dental software package, a volume rendering software package, a navigation software package that allows an operator to navigate through 3D images, a navigation plus volume rendering software package, a CT perfusion software package, a CT vessel analysis package, a fusion software package to compare 3D images from CT and MR systems, a MR tool package to mathematically and/or statistically analyze dynamic data sets, a CV flow software package, a mass analysis software package, a Real Time Image Processing (RTIP) software package, an X-ray analysis software package, an X-ray vessel analysis software package, a reconstruction software package, and a 3D X-ray software package. This is not an exclusive list of software packages available for use on a radiological imaging workstation.

These various software packages perform a myriad of imaging and analysis functions for an operator, such as a radiologist. The volume analysis package consists of a combination of CT/MR analysis packages and 3D analysis software packages. The CT/MR analysis package provides expanded analysis capabilities, such as interactive Multiplanar Reformation (MPR) and Multi-projection Volume Reconstruction (MPVR). MPR allows the creation of images in any plane and at any angle for the creation of a 2D image from a curved cutting plane. MPVR is a selective volume projection on a user-defined plane. MPVR includes Maximum and Minimum Intensity Projection (MIP). The creation of oblique slices with variable thickness and orientations is available with this option.

The 3D analysis package is a software option available for CT and MR data sets. The 3D analysis packages provide an operator with a variety of capabilities, such as 3D presentation modes and 3D object manipulation. The3D presentation modes may include bone, soft tissue, and surface Maximum Intensity Pixel (MIP), summation, integral, minimum intensity pixel, and multiple light sources. 3D object manipulation may include disarticulation, dynamic thresholding, morphological operations, surface extractions and volume analysis. Additional capabilities may include 3D image addition and subtraction, surface erosion, surface dilation, and a segmenting tool. Analysis features may include distance measuring, angle measuring, image location, inverse video, filtering, and image annotation.

A dental software may be used to create a comprehensive set of cross-referenced composite axial, panorex and oblique planar reformations of the mandible or maxilla. This software is especially useful in dental implant surgery.

Volume rendering software enables an operator to display all tissue from anterior to posterior with density-based shading and full color. This allows visibility of small detailed structures and enhances the presentation of spatial relationships in many situations, i.e., CT angioplasty.

Navigation software generates 3D surface rendered images of hollow structures. The software also enables real time navigation through the rendered hollow structures. This software can be used with both CT and MR images. The fusion software package enables an operator to use the radiological workstation to compare 3D images from a CT system and a MR system.

The CV flow software is used for evaluating flow parameters in vessels. The software enables automated contour tracing and simple editing. The mass analysis software is used for automated left ventricular analysis. The program enables an operator to use the radiological workstation for automatic contour drawing, simple editing, automatic analysis of ventricular function, including wall motion analysis, and muscle mass calculations. The mass viewer software is used for viewing multi-phase, multi-level cardiac image data.

The X-ray analysis software provides tools to the radiological imaging workstation that are useful for the review of DICOM X-ray images. Features of the XR analysis software are dynamic sequence review, independent image manipulation, filming operations, seven edge enhancement filters, image subtraction and landscaping functions, pixel shifting and maximum opacification. Analysis features include image filtering and mask subtraction.

The X-ray vessel analysis software is a post-processing software package for the workstation that provides an additional tool for the analysis of X-ray angioplasty data The software provides a number of display, measurement and reporting/filming features to study user-selected vessels. The operator is provided with a variety of different 3D and reformatted images from which to perform analysis measurements. The interaction between a unique 3D enhanced lumen tracing and flexible measurements tools enable an operator to perform stenosis planning for surgical/interventional planning, post intervention assessment, disease progression, and stent planning. Measurements that may be taken with the radiological image viewing station with the X-ray vessel analysis software include relative percentage stenosis, minimum, mean, and projected diameter, distance measurement, cross-sectional area, volume measurement, and angle measurement.

The reconstruction software package is a post-production software package designed to reconstruct a full leg arterial tree on one single pasted image from Bolus Chasing images. The software enables an operator the ability to visualize in one image the entire arterial tree of both lower limbs, eliminating the need for long film changers. Straight is software used for therapy planning, before irradiation of an AVM. This software provides distortion free images, allowing stereotactic examination in a compact digital room, eliminating the requirement for film changers.

Figure 4:
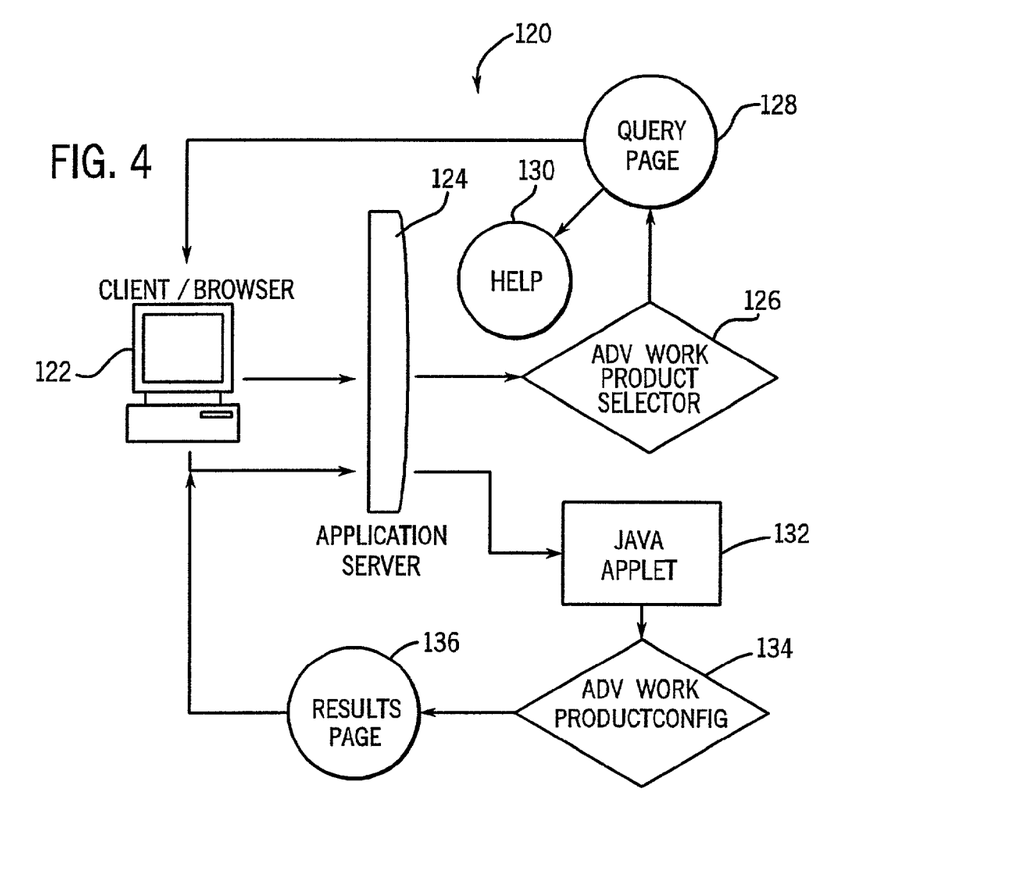
FIG. 4 is a diagrammatical representation of a computer system to enable a radiological imaging workstation supplier to provide a customer with a recommendation for a radiological imaging workstation.

Referring generally to FIG. 4, a system 120 is illustrated that enables a radiological imaging workstation supplier to provide a customer with a recommended radiological imaging workstation for the customer's PACS. A radiological imaging workstation may be selected as a potential recommended radiological imaging workstation for a variety of reasons. For example, specific configurations of radiological imaging workstations may be selected to represent recommended radiological imaging workstations based on the sales history of that specific configuration of radiological imaging workstation, with the radiological imaging workstation configurations having the highest sales representing recommended radiological imaging workstations.

In the illustrated embodiment, a customer may use a computer 122, or other browsing device to access the system 120 over a network, such as the Internet. The system 120 utilizes an application server 124, an "ADV Workstation" product selector file 126, a query page 128, a help page 130, a Java applet 132, an "ADV Workstation" product configuration file 134 and a results page 136 to provide a customer with a recommended radiological imaging workstation. The application server 124 is used to route information around system 120. The application server may comprise a program, such as a Java class. The "ADV Workstation" product selector file 126 holds the data that is used to populate the query page 128 to be supplied to the customer. The query page 128 contains questions designed to enable the supplier to determine a radiological imaging workstation, components, and/or software to recommend to the customer that meet the needs of the customer. The help page 130 is linked to the query page 128 and contains additional information to assist a customer in answering at least one of the questions.

The Java applet 132 compares the answers in the completed query page 128 to data in the "ADV Workstation" product configuration file 134. The "ADV Workstation" product configuration file contains a set of data for a plurality of radiological imaging workstations that correspond to predicted responses to the questions in the "ADV Workstation" product selector file. All possible combinations of answers to the plurality of questions may be provided with an associated, or recommended, radiological imaging workstation. Alternatively, not all of the possible combinations may be provided with a corresponding, or recommended, radiological imaging workstation. This smaller set of combinations may be based on a number of factors. For example, the product configuration file 134 may be written so that a recommendation is made only for the most commonly sold configurations of radiological imaging workstations. If the Java applet 132 finds a match between the customer's response and a predicted response, the radiological imaging workstation information corresponding to the predicted response is provided to the customer via the results page 136. If there is no match, an advisory may be provided to the customer to contact a sales representative.

In the illustrated embodiment, the "ADV Workstation" product selector file 126 and the "ADV Workstation" product configuration file 134 are XML files. XML is a method for putting structured data in a text file. XML is powerful because it maintains the separation of the user interface from structured data. HTML specifies how to display data in a browser, but XML defines the content. For example, in HTML tags are used to tell the browser to display data as bold or italic; in XML, style sheets are employed to present the data in a browser. XML separates the data from the presentation and processing, enabling data to be displayed and processed differently by applying different style sheets and applications.

As will be appreciated by those skilled in the art, XML is a meta-markup language that provides a format for describing structured data. This facilitates more precise declarations of content and more meaningful search results across multiple platforms. An unlimited set of tags may be defined in XML. As noted above, while HTML tags may be used to display a word in bold or italic, XML provides a framework for tagging structured data. An XML element can declare its associated data to be a price, a tax, a title, or any other desired data. As XML tags are adopted, there will be a corresponding ability to search for and manipulate data regardless of the applications within which it is found. Once data has been located, it can be delivered over a network and presented in a browser in any number of ways, or it can be handed off to other applications for further processing and viewing.

XML is a subset of the Standard Generalized Markup Language (SGML) that is optimized for delivery over the Web. XML provides a data standard that can encode the content, semantics, and schemata for a wide variety of cases ranging from simple to complex, and which may be used to markup the following: an ordinary document; a structured record, such as an appointment book or purchase order; an object with data and methods, such as the persistent form of a Java object; a data record, such as the result set of a query; meta content of a site; graphical presentations; standard schema entities and types; and all links between entities and types. Once the data is on the clients desktop it can be manipulated, edited, and presented in multiple views, without returning to the server. Servers may then become more scalable, due to lower computational and bandwidth loads. Also, because data is exchanged in the XML format, it can be easily merged from different sources. In the illustrated embodiment, the "ADV Workstation" product selector file is an XML file. However, "ADV Workstation" product selector file 126 may be defined by other file or application types, including a different markup language, such as HTML.

Figure 5:
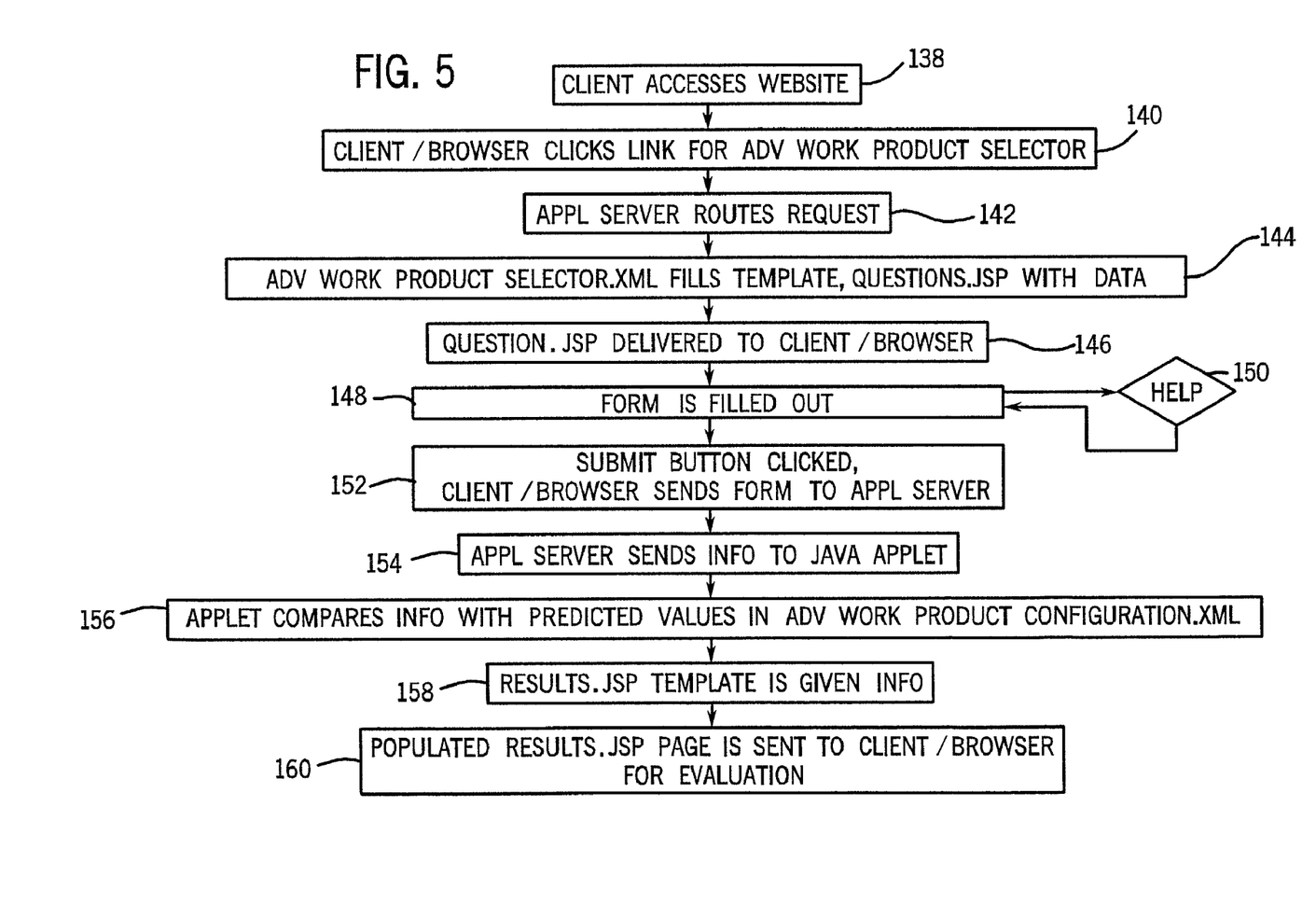
FIG. 5 is a flowchart for a process whereby a radiological imaging workstation supplier may provide a customer with a recommendation for a radiological imaging workstation.

Referring generally to FIG. 5, an exemplary process by which a customer may be provided with information for a recommended radiological imaging workstation is illustrated. Initially, a customer or client accesses a site, as referenced by step 138. The site may provide a radiological imaging workstation supplier home page, a radiological imaging workstation specification page, a product selector page, or some other page of interest to a customer or client interested in purchasing a radiological imaging workstation, radiological imaging workstation component, or software. Initially, the client or customer activates a link on the page to enter a radiological imaging workstation product selector, as referenced by step 140. An application server routes the request to enter the radiological imaging workstation product selector to an "ADV Workstation" product selector file, as referenced by step 142. In an exemplary embodiment, the "ADV Workstation" product selector file is an XML file. The "ADV Workstation" product selector file contains the data representing the questions to ask a customer to narrow the choice of a radiological imaging workstation, component, or software to a recommended radiological imaging workstation, component, or software. The "ADV Workstation" product selector file fills the query page template with the data, e.g., questions, as referenced by step 144. In an exemplary embodiment, the query page is a Java script file. The query page is sent to the customer browser for completion, as referenced by step 146.

The customer then completes the query page, as referenced by step 148. If a customer would like additional information to help in choosing an answer, the client may activate a link to a help file, as referenced by step 150. When the link is activated, a help page 130 is presented to the customer. In this embodiment, the help page 130 provides additional information specific to each question on the query page. The additional information is designed to assist the customer answer the questions. After obtaining the information, the customer may then return to the query page and continue answering questions. When the customer has completed answering the questions, the completed query page is sent back to the application server by activating a virtual button on the query page, as referenced by step 152.

In the exemplary process, the application server couples the completed query page 128 to a Java applet 132, as referenced by step 154. The Java applet 132 compares the information provided by the customer in their answers to the questions in the query page to predicted responses to the questions contained within the product configuration file 134, as referenced by step 156. If a match is found between the customer's response to the questions and the predicted responses to the questions, the results page 136 is filled with data describing the recommended radiological imaging workstation, component, or software, that corresponds to the predicted responses to the questions, as referenced by step 158. The results page 136 is then provided to the customer for viewing and/or evaluation, as referenced by step 160.

Figure 6:
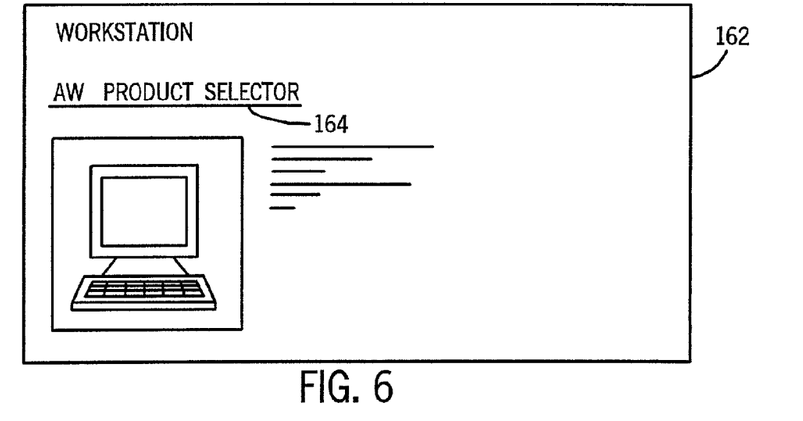
FIG. 6 is a representation of a page for a radiological imaging workstation supplier, the page having a link to a radiological imaging workstation product selector.

Referring generally to FIG. 6, a page 162 for a radiological imaging workstation supplier is illustrated. The page 162 may contain information about the supplier's radiological imaging workstations, components or software. In addition, the page 162 also contains a link 164 to a radiological imaging workstation product selector.

Figure 7:
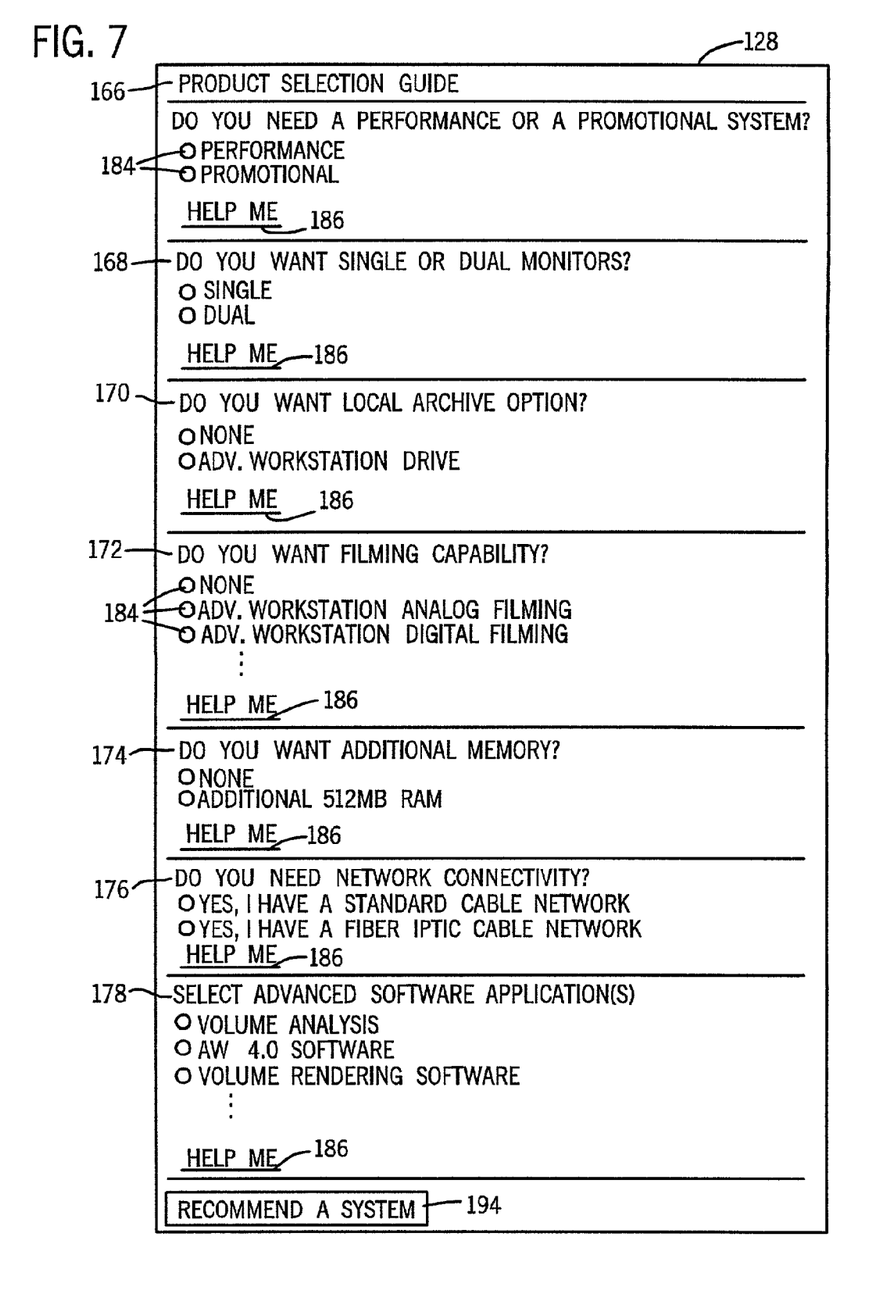
FIG. 7 is a representation of a query page for a radiological imaging workstation product selector.

Referring generally to FIG. 7, when the link 164 is activated, system 120 operates to provide the customer browser 122 with a query page 128. In the illustrated embodiment, there are a series of multiple-choice questions 166, 168, 170, 172, 174, 176, and 178 provided to a customer. Each choice is answered by selecting one or more of the choice registers 184. Some questions may have mutually exclusive answers while others may allow multiple answers. The choice registers 184 may be selected by placing the cursor over a choice register 184 and clicking with a mouse button.

The series of questions may be designed to elicit all manner of customer information. For example, the questions may be used to determine the single best radiological imaging workstation, including components and software, according to the needs of each customer. The questions also may be designed to give a supplier an indication of what support, such as training, the customers needs to operate the imaging workstation.

In the illustrated embodiment, the first question 166 asks the customer if the customer needs a performance system or a promotional system. The systems selected as promotional systems typically do not have the same level of capabilities as those of a performance system. They also are typically priced less that the performance systems.

The second question 168 asks what type of monitor the customer would like for their radiological imaging workstation. This is an important factor for radiological image viewing. For example, a customer may desire a single monitor or dual monitors. Additionally, a customer may desire a color monitor or a grayscale monitor. The third question 170 asks if the customer needs an archiving module. The customer may be able to select the storage media, such as an optical storage system or a CD-R system. The fourth question 172 asks whether the customer wants filming capability. The fifth question 174 asks if the customer wants additional memory. The sixth question 176 asks if the customer needs network connectivity.

The seventh question 178 asks the customer to select software applications for use on the radiological imaging workstation. There are a number of different software applications that may be utilized by a radiological imaging workstation. The client may select from a list that may include: a volume analysis software package, a dental software package, a volume rendering software package, a navigation software package that allows an operator to navigate through 3D images, a navigation plus volume rendering software package, a CT perfusion software package, a CT vessel analysis package, a fusion software package to compare 3D images from CT and MR systems, a MR tool package to mathematically and/or statistically analyze dynamic data sets, a CV flow software package, a mass analysis software package, a Real Time Image Processing (RTIP) software package, an X-ray analysis software package, an X-ray vessel analysis software package, a reconstruction software package, and a 3D X-ray software package. However, this is not an exclusive list of software packages available for use on a radiological imaging workstation.

Figure 8:
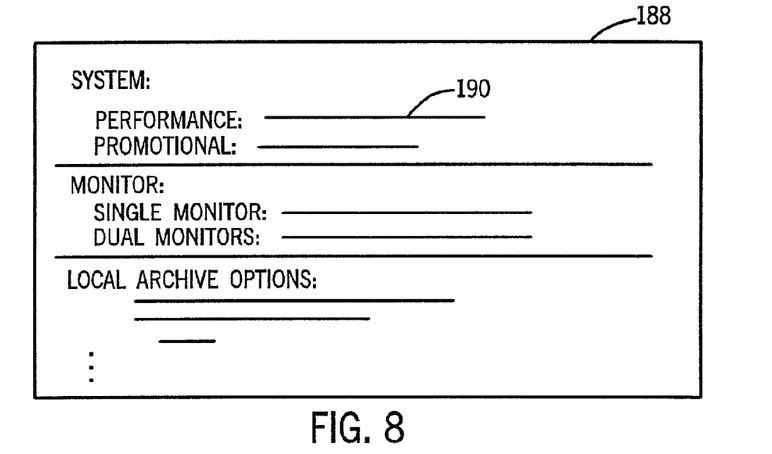
FIG. 8 is a representation of a help page for a radiological imaging workstation product selector.

In addition, in this embodiment, each question has a link 186 to the "Help Me" file 130. When the link 186 is activated a small Help window 188 is opened, as best illustrated in FIG. 8. In the illustrated embodiment, the link 186 after the first question 166 has been activated. Help window 188 provides text 190 to enable the customer to select between the performance system and the promotional system.

An example of information that may be included in the help window 188 are the descriptions of the software packages described above and the microprocessors and hardware used in the radiological imaging workstations. However, "Help Me" file 130 (and help window 188) may be populated with any type of information that may be designed to assist a customer in answering any of the questions provided to the customer. For example, to assist a customer to answer the second question 168, the help file may describe the various monitors and provide specification information, such as the screen size and resolution. To assist a customer to answer the third question 170, the help file may describe the local archiving options, such as a DICOM MOD drive and a CR-R DICOM drive. In addition, the help file 130 may provide specification on the various archiving options, such as the storage media size. The help file 130 may also have descriptions of the various software packages that may be selected.

Referring again to FIG. 7, when the customer has made their selections, a virtual button 194 may be activated. Activating the virtual button 194 directs the query page to be returned to the system 120 and directs the system 120 to provide the customer with a recommended radiological imaging workstation, component or software.

Figure 9:
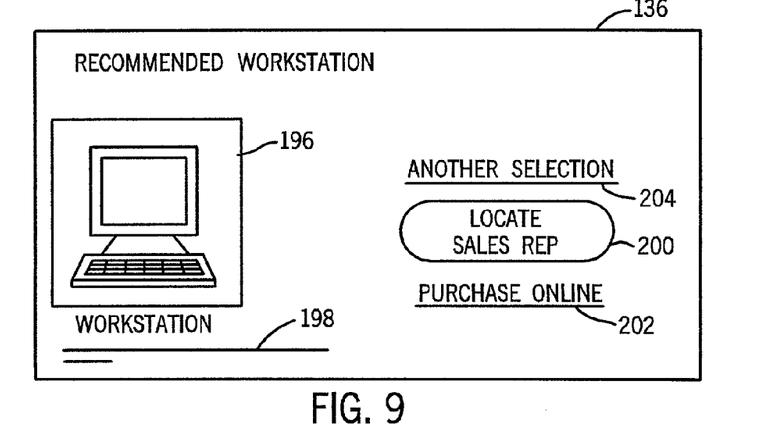
FIG. 9 is a representation of a results page featuring a recommended radiological imaging workstation.

Referring generally to FIG. 9, system 120 provides the recommendation for a radiological imaging workstation, component, or software on a results page 136. The results page 136 provides the customer with a recommended system 196 and recommended options 198. Additionally, results page 136 may have a virtual button 200 that is operable to activate a program to identify a supplier sales representative located near the customer. The results page 136 may also have a purchasing link 202 to initiate a purchasing program to enable a customer to purchase a radiological imaging workstation, component, or software. The results page 136 may also have a link 204 to enable a customer to perform another product selection with the "ADV Workstation" product selector.

Figure 10:
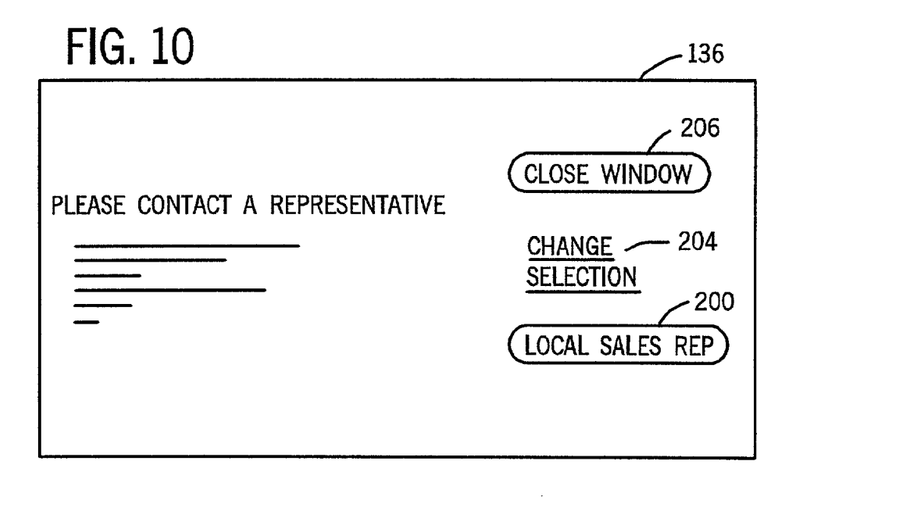
FIG. 10 is a representation of a results page when the system cannot provide a recommended radiological imaging workstation and directing the customer to contact a supplier's representative.

As best illustrated in FIG. 10, if there is no radiological imaging workstation, component, or software that matches the customer's responses to the questions the results page 136 may inform the customer that no radiological imaging workstation, component, or software may be recommended based on the customers responses to the questions. The customer may be informed to contact a radiological imaging workstation supplier's sales representative. Therefore, this embodiment of results page 136 also may have a virtual button 200 that is operable to activate a program to identify the supplier's sales representative nearest to the customer. The results page 136 also may have a virtual button 206 to close the browser to close the product selector.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A computer system coupled to a network to enable a radiological imaging workstation supplier to provide a customer with information for a recommended radiological imaging workstation, the computer system comprising:

an application server to direct a query page to the customer via the network, wherein the query page comprises a plurality of questions designed to enable the computer system to determine a recommended radiological imaging workstation based on the customer's responses to the plurality of questions, the radiological viewing workstation enabling an operator to view images produced by imaging systems of different modalities, further wherein at least one of the plurality of questions establishes the imaging software to be recommended;

a comparison program to receive a completed query page from the customer and compare the customer's responses in the completed query page to a plurality of predicted responses to the plurality of questions, a predicted response corresponding to a radiological imaging workstation configuration; and a server to provide a results page to the customer via the network, the results page providing the customer with a recommended radiological imaging workstation, wherein the information stored in the computer system is stored in a product configuration file, wherein the product configuration file contains data on specific configurations of radiological imaging workstations, wherein the specific configurations of radiological imaging workstations is determined by a sales history of specific configurations of radiological imaging workstations.

2. The system as recited in claim 1, wherein at least one of the modalities of imaging systems is a computed tomography (CT) system.

3. The system as recited in claim 1, wherein at least one of the modalities of imaging systems is a magnetic resonance imaging (MR) system.

4. The system as recited in claim 1, further comprising a product selector file, wherein the product selector file contains the plurality of questions for supplying the query page.

5. The system as recited in claim 4, wherein the product selector file is written in extensible markup language (XML).

6. The system as recited in claim 1, wherein the query page is written in Java script.

7. The system as recited in claim 1, wherein the query page comprises a link to a help page, wherein the help page provides information to assist a customer answer at least one of the plurality of questions.

8. The system as recited in claim 1, wherein each question has an associated link to a help page, wherein the help page provides information to assist a customer answer each of the plurality of questions.

9. The system as recited in claim 1, wherein a product selector file populates the results page with a specific radiological imaging workstation configuration that matches the customer's responses in the completed query page.

10. The system as recited in claim 1, wherein the results page is written in Java script.

11. The system as recited in claim 1, wherein a specific configuration of a radiological imaging workstation comprises software packages.

12. The system as recited in claim 1, wherein the product selector file is written in extensible markup language (XML).

13. A computer system coupled to a network to assist a customer to select a radiological imaging workstation from among a plurality of radiological imaging workstations, the computer system comprising:

an application server coupled to a network, the application server directing a customer to files stored in the computer system;

a product selector file written in a markup language and stored in the computer system, the product selector file defining a plurality of questions designed to elicit data from a customer to determine a single radiological imaging workstation to recommend to the customer from among a plurality of radiological imaging workstations, wherein the product selector file provides the plurality of questions to a query page for delivery to a customer;

a program that operates to determine a recommended radiological imaging workstation for the customer by comparing data provided by the customer via the plurality of questions to radiological imaging workstation data stored in the computer system; and a product configuration file written in a markup language and stored in the computer system, the product configuration file holding the radiological imaging workstation data used by the program, wherein the program populates a results page with a specific radiological imaging workstation configuration that matches a customer's responses to the plurality of questions on the query page.

14. The system as recited in claim 13, wherein the radiological imaging workstation data comprises data relating to specific configurations of radiological imaging workstations.

15. The system as recited in claim 14, wherein the specific configurations of radiological imaging workstations is determined by a sales history of specific configurations of radiological imaging workstations.

16. The system as recited in claim 13, wherein the product selector file is written in extensible markup language (XML).

17. The system as recited in claim 13, wherein the product configuration file is written in extensible markup language (XML).

18. The system as recited in claim 13, wherein each question is a multiple-choice question.

19. The system as recited in claim 18, further comprising a help file written in a markup language and containing information regarding each choice in at least one multiple-choice question.

20. The system as recited in claim 19, wherein the help file is written in hypertext markup language (HTML).

21. The system as recited in claim 13, wherein the application server is a Java class.

22. The system as recited in claim 13, wherein the program is a Java applet.

23. The system as recited in claim 13, wherein the query page is written in a Java script language.

24. The system as recited in claim 13, wherein the results page is written in a Java script language.

25. The system as recited in claim 13, wherein a recommended computer system comprises software.

26. A computer system coupled to a network to assist a customer to select a radiological imaging workstation from among a plurality of radiological imaging workstations, the computer system comprising:

an application server coupled to a network, the application server directing a customer to files stored in the computer system;

a product selector file written in a markup language and stored in the computer system, the product selector file defining a plurality of questions designed to elicit data from a customer to determine a single radiological imaging workstation to recommend to the customer from among a plurality of radiological imaging workstations, wherein the product selector file provides the plurality of questions to a query page for delivery to a customer;

a program that operates to determine a recommended radiological imaging workstation for the customer by comparing data provided by the customer via the plurality of questions to radiological imaging workstation data stored in the computer system; and a product configuration file written in a markup language and stored in the computer system, the product configuration file holding the radiological imaging workstation data used by the program, wherein the radiological imaging workstation data comprises data relating to specific configurations of radiological imaging workstations, wherein the specific configurations of radiological imaging workstations is determined by a sales history of specific configurations of radiological imaging workstations.

27. A computer system coupled to a network to enable a radiological imaging workstation supplier to provide a customer with information for a recommended radiological imaging workstation, the computer system comprising:
an application server to direct a query page to the customer via the network, wherein the query page comprises a plurality of questions designed to enable the computer system to determine a recommended radiological imaging workstation based on the customer's responses to the plurality of questions, the radiological viewing workstation enabling an operator to view images produced by imaging systems of different modalities, further wherein at least one of the plurality of questions establishes the imaging software to be recommended;
a comparison program to receive a completed query page from the customer and compare the customer's responses in the completed query page to a plurality of predicted responses to the plurality of questions, a predicted response corresponding to a radiological imaging workstation configuration; and
a server to provide a results page to the customer via the network, the results page providing the customer with a recommended radiological imaging workstation,
wherein the information stored in the computer system is stored in a product configuration file, wherein the product configuration file contains data on specific configurations of radiological imaging workstations,
wherein a product selector file populates the results page with a specific radiological imaging workstation configuration that matches the customer's responses in the completed query page.

28. The system as recited in claim 27, wherein the modalities of imaging systems comprise magnetic resonance imaging (MRI), computed tomography (CT), positron emission tomography (PET), radio fluoroscopy (RF), ultrasound, or computed radiography (CR), or combinations thereof.

29. The system as recited in claim 27, wherein the query page comprises questions relating to a performance or promotional system option, a single monitor or multiple monitors option, an archive option, a filming capability option, a memory option, a network option, or a software option, or a combination thereof.

30. The system as recited in claim 27, wherein the query page comprises questions relating to a filming capability.

31. The system as recited in claim 30, wherein the question relating to the filming capability include an analog filming option and a digital filming option.

32. The system as recited in claim 27, wherein the query page comprises questions relating to software options including a volume analysis software package, a dental software package, a volume rendering software package, a navigation software package that allows an operator to navigate through 3D images, a navigation plus volume rendering software package, a CT perfusion software package, a CT vessel analysis package, a fusion software package to compare 3D images from CT and MR systems, a MR tool package to mathematically and/or statistically analyze dynamic data sets, a CV flow software package, a mass analysis software package, a Real Time Image Processing (RTIP) software package, an X-ray analysis software package, an X-ray vessel analysis software package, a reconstruction software package, or a 3D X-ray software package, or a combination thereof.

33. A computer-implemented system, comprising:
a medical imaging workstation selector disposed on a computer-readable medium, wherein the medical imaging workstation selector is configured to obtain customer input from a query page having questions relating to configuration options for a medical imaging workstation;
wherein the medical imaging workstation selector is configured to compare the customer input with data on specific configurations of medical imaging workstations, wherein the specific configurations are determined, at least in part, by a sales history of specfic configurations of medical imaging workstations; and
wherein the medical imaging workstation selector is configured to populate a results page with a specfic medical imaging workstation configuration based on the customer input and the data on specfic configurations, and
wherein the specfic configurations of medical imaging workstations comprise a magnetic resonance imaging (MRI) system, a computed tomography (CT) system, a positron emission tomography (PET) system, a radio flu oroscopy (RF) system, an ultrasound system, or a computed radiography (CR) system, or a combination thereof.

34. The system as recited in claim 33, wherein the configuration options comprise a performance or promotional system option, a single monitor or multiple monitors option, an archive option, a filming capability option, a memory option, a network option, or a software option, or a combination thereof.

35. The system as recited in claim 33, wherein the configuration options comprise a filming capability option.

36. The system as recited in claim 35, wherein the filming capability option comprises an analog filming option and a digital filming option.

37. The system as recited in claim 33, wherein configuration options comprise a software option including a volume analysis software package, a dental software package, a volume rendering software package, a navigation software package that allows an operator to navigate through 3D images, a navigation plus volume rendering software package, a CT perfusion software package, a CT vessel analysis package, a fusion software package to compare 3D images from CT and MR systems, a MR tool package to mathematically and/or statistically analyze dynamic data sets, a CV flow software package, a mass analysis software package, a Real Time Image Processing (RTIP) software package, an X-ray analysis software package, an X-ray vessel analysis software package, a reconstruction software package, or a 3D X-ray software package, or a combination thereof.

* * * * *